(No Model.)

C. W. PEARCE.
MOTOR.

No. 513,529. Patented Jan. 30, 1894.

WITNESSES:
Chas. Nida
C. Sedgwick

INVENTOR
C. W. Pearce
BY Munn & Co.
ATTORNEYS

UNITED STATES PATENT OFFICE.

CHARLES WILLIAM PEARCE, OF DILLER, NEBRASKA.

MOTOR.

SPECIFICATION forming part of Letters Patent No. 513,529, dated January 30, 1894.

Application filed April 18, 1893. Serial No. 470,891. (No model.)

*To all whom it may concern:*

Be it known that I, CHARLES WILLIAM PEARCE, of Diller, in the county of Jefferson and State of Nebraska, have invented a new and Improved Motor, of which the following is a full, clear, and exact description.

The object of the invention is to provide a new and improved motor, which is simple and durable in construction, very effective in operation, adapted to be actuated by hand or other power, and arranged to transmit the motive power applied in the most economical manner.

The invention consists of certain parts and details, and combinations of the same, as will be hereinafter described, and then pointed out in the claims.

Reference is to be had to the accompanying drawings forming a part of this specification, in which similar letters of reference indicate corresponding parts in both the figures.

Figure 1:
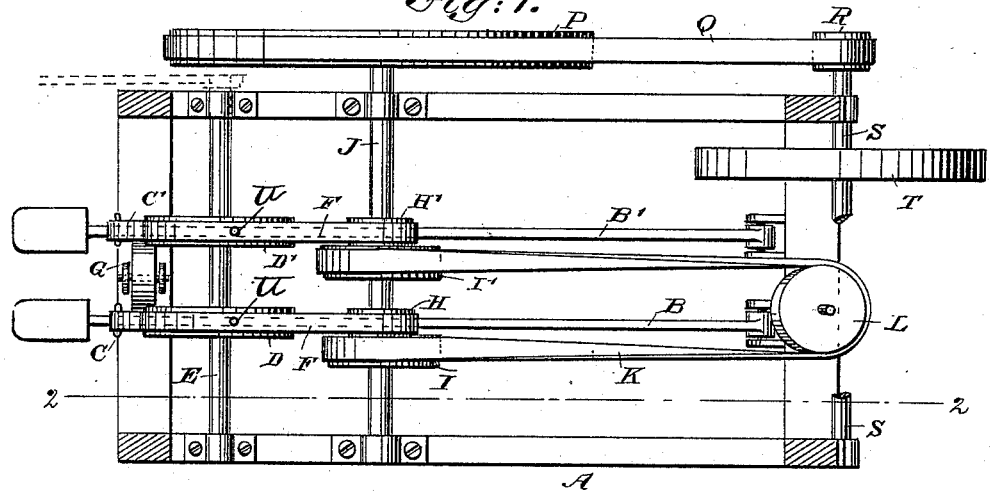
Figure 2:
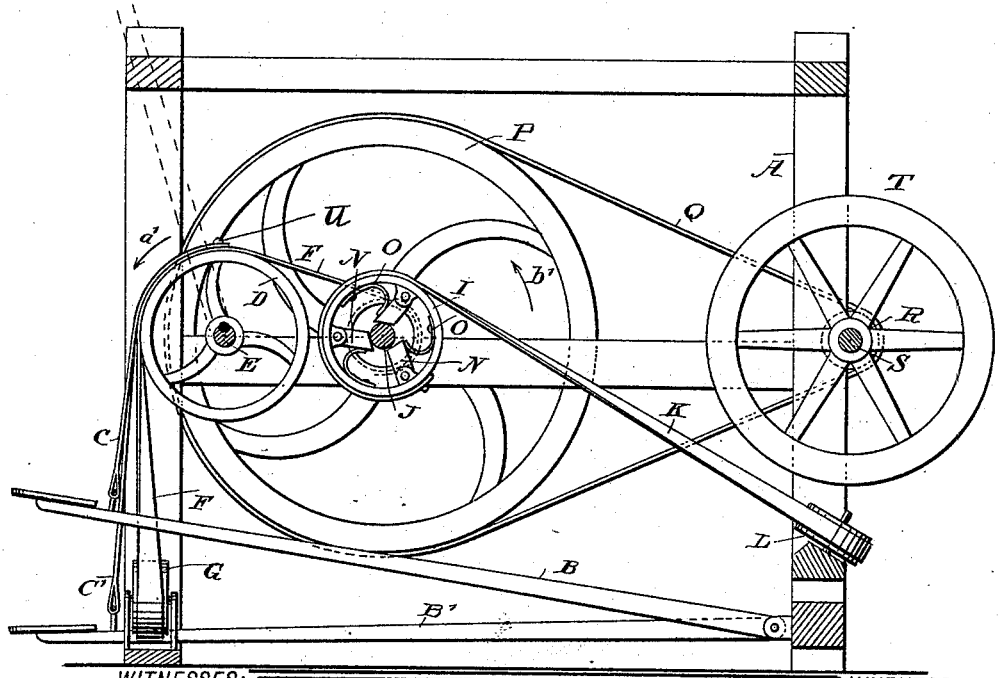

Figure 1 is a plan view of the improvement with parts in section, and Fig. 2 is a sectional side elevation of the same on the line 2—2 of Fig. 1.

The improved motor is provided with a suitably-constructed frame A, on which are pivoted the longitudinally-extending treadles B and B', connected by bands C and C' respectively, with the rims of pulleys D and D', respectively, one of which is loose, and the other keyed or otherwise secured on a shaft E mounted to rock in suitable bearings attached to the main frame A.

On the rims of the pulleys D and D' is also secured a belt F extending downwardly to pass under a pulley G journaled in the frame A, and of such a diameter that the ends of the belt passing over the said pulley G readily pass up onto the rims of the pulleys D and D'. The belt F passes with its ends, from the pulleys D and D', to smaller pulleys H and H' respectively, to the rims of which the belt ends are fastened. The pulleys H and H' carry on their faces, clutch pulleys I and I' respectively, and are mounted to rotate loosely on a driving shaft J journaled in suitable bearings on the main frame A.

On the rims of the clutch pulleys I and I' are secured the ends of a belt K, which extends forwardly and passes around a pulley L journaled on the frame A, as plainly shown in Figs. 1 and 2.

On the inside of the rim of each pulley I and I' are pivoted clutch arms or levers N adapted to engage with their inner ends the shaft J at the time the pulleys are turned in one direction, the said levers disengaging the shaft on the return movement of the lever, so as not to affect the forward rotation of the shaft. The clutch levers N are held in contact with the shaft J by means of springs O secured by means of the same pins or clamps U which serve to secure the band C and C' respectively to the inner surfaces of the rims of the pulleys I, I', the free ends of the said springs pressing on the corresponding clutch levers.

On one end of the shaft J is secured a large wheel P over which passes a belt Q also passing over a pulley R secured on the driven shaft S carrying a fly wheel T and connected with the machinery to be driven.

The operation is as follows: When the treadles B and B' are set in alternate up and down motion, then the bands C and C' pull alternately on the pulleys D and D' in the direction of the arrow $a'$, so that the ends of the belt F exert a pull on the small pulleys H and H', in the direction of the arrow $b'$, whereby the clutch levers N held on the pulleys I, I', forming part of the pulleys H, H', cause a rotation of the shaft J in the direction of the arrow $b'$. The rotary motion of the shaft J is transmitted by the wheel P, belt Q and pulley R to the driven shaft S. Now, it is understood that when one treadle B or B' moves downward, the other treadle B' or B swings upward on account of the return motion imparted to the respective pulley I' or I, by the belt K, so that the corresponding pulley H' or H, with the corresponding end of the belt F is turned in the inverse direction of the arrow $b'$, whereby the corresponding pulley D' or D, is likewise turned in the inverse direction of the arrow $a'$, thus moving the corresponding treadle B' or B upward during the time the other treadle swings downward.

If desired, the motive power for actuating the device may be directly applied to the rock shaft E by means of a lever (see dotted lines, Figs. 1 and 2), or other mechanism, it being, however, understood that a rocking motion must be given to the said shaft E. It will be seen that by this arrangement, the motive power applied is transmitted in the most economical manner to the driven shaft S. It is further understood that on revolving the clutch pulleys I, I', in the inverse direction of the arrow $b'$, the clutch levers N glide over the shaft J and only impinge on the said shaft at the time the clutch pulleys turn in the direction of the arrow $a'$.

If desired the springs O for one set of levers N may be made somewhat stronger than the ones for the other set of levers, so as to form a clutch for the shaft J in order to enable the operator to work the machine with a single treadle. It is understood that by this arrangement the clutch with the strong springs will have a stronger frictional engagement with the shaft than the other clutch on the forward motion of the shaft whereby the clutch pulley having the stronger clutch will be rotated with the shaft, and the treadle connected with said pulley will be lifted.

Having thus fully described my invention, I claim as new and desire to secure by Letters Patent—

1. A motor, comprising a driving shaft, pulleys loosely mounted thereon, a belt connecting the said pulleys, clutch pulleys secured to the said driving shaft pulleys and carrying clutch levers engaging the driving shaft to rotate the same in one direction, another belt for connecting the said clutch pulleys and causing them to rotate in opposite directions, and means for imparting an oscillating motion to the said clutch pulleys to alternately rotate the driving shaft, substantially as shown and described.

2. A motor comprising a rock shaft adapted to be actuated by the power applied, a fast pulley and a loose pulley mounted on the said rock shaft, a driving shaft, pulleys mounted to rotate loosely on the said driving shaft and connected by belt with the pulleys on the rock shaft, and clutch pulleys secured on the driving shaft pulleys and carrying spring-pressed clutch levers engaging the said driving shaft, substantially as shown and described.

3. A motor comprising a rock shaft adapted to be actuated by the power applied, a fast pulley and a loose pulley mounted on the said rock shaft, a driving shaft, pulleys mounted to rotate loosely on the said driving shaft and connected by belt with the pulleys on the rock shaft, clutch pulleys secured on the driving shaft pulleys and carrying spring-pressed clutch levers engaging the said driving shaft, and a belt secured with its ends on the clutch pulleys and passing over a pulley, so that when one clutch pulley rotates in one direction, the other pulley is caused to turn in the opposite direction by the action of the said belt, substantially as shown and described.

4. A motor comprising a rock shaft adapted to be actuated by the power applied, a fast pulley and a loose pulley mounted on the said rock shaft, a driving shaft, pulleys mounted to rotate loosely on the said driving shaft and connected by belt with the pulleys on the rock shaft, clutch pulleys secured on the driving shaft pulleys and carrying spring-pressed clutch levers engaging the said driving shaft, a belt secured with its ends on the clutch pulleys and passing over a pulley, so that when one clutch pulley rotates in one direction, the other pulley is caused to turn in the opposite direction by the action of the said belt, treadles, bands connecting the said treadles with the pulleys on the shaft, and a second pulley under which passes the belt connecting the rock shaft pulleys with the loose pulleys on the driving shaft, substantially as shown and described.

CHARLES WILLIAM PEARCE.

Witnesses:
GEO. H. TONNEMAKER,
R. V. FOLKERS.